US010114939B1

(12) United States Patent
Bhalerao

(10) Patent No.: US 10,114,939 B1
(45) Date of Patent: Oct. 30, 2018

(54) SYSTEMS AND METHODS FOR SECURE COMMUNICATIONS BETWEEN DEVICES

(71) Applicant: Symantec Corporation, Mountain View, CA (US)

(72) Inventor: Kokil Bhalerao, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 121 days.

(21) Appl. No.: 14/492,103

(22) Filed: Sep. 22, 2014

(51) Int. Cl.
*H04L 29/06* (2006.01)
*G06F 21/44* (2013.01)
*H04L 29/08* (2006.01)
*H04W 12/06* (2009.01)
*H04L 9/32* (2006.01)

(52) U.S. Cl.
CPC ............ *G06F 21/44* (2013.01); *H04L 9/3263* (2013.01); *H04L 63/0823* (2013.01); *H04L 67/12* (2013.01); *H04W 12/06* (2013.01)

(58) Field of Classification Search
CPC ........ G06F 21/33; G06F 21/335; G06F 21/44; H04L 63/0823; H04L 67/12; H04W 4/005
USPC .................................... 726/30; 713/156, 175
See application file for complete search history.

(56) References Cited

U.S. PATENT DOCUMENTS

| 5,712,914 A * | 1/1998 | Aucsmith | G06F 21/32 380/30 |
| 6,175,626 B1 * | 1/2001 | Aucsmith | G06F 21/32 380/30 |
| 6,202,151 B1 * | 3/2001 | Musgrave | G06Q 20/04 713/170 |
| 6,233,577 B1 * | 5/2001 | Ramasubramani | H04L 29/06 |
| 6,310,966 B1 * | 10/2001 | Dulude | G06Q 20/04 382/115 |
| 6,353,891 B1 * | 3/2002 | Borella | G06F 21/33 726/1 |

(Continued)

FOREIGN PATENT DOCUMENTS

| KR | 20130120050 A | * 11/2013 | H04N 19/44 |
| KR | 101353617 B1 | * 1/2014 | |
| WO | WO-2013117408 A1 | * 8/2013 | G06F 21/44 |

OTHER PUBLICATIONS

Seitz, "Use Cases for Authentication and Authorization in Constrained Environments", RFC7744, Jan. 1, 2016, 61 pages.*

(Continued)

Primary Examiner — Luu T Pham
Assistant Examiner — Walter J Malinowski
(74) Attorney, Agent, or Firm — FisherBroyles, LLP

(57) ABSTRACT

The disclosed computer-implemented method for secure communications between devices may include (1) receiving, from a control device that is capable of providing instructions to one or more smart devices, a security certificate that identifies the control device and also contains privilege information that indicates how the control device is allowed to interact with the smart devices, (2) receiving, from the control device, a request to interact with a smart device, (3) analyzing the privilege information in the security certificate to determine whether the requested interaction is allowed by the privilege, and (4) controlling the requested interaction based on whether the privilege information indicates that the requested interaction is allowed. Various other methods, systems, and computer-readable media are also disclosed.

20 Claims, 7 Drawing Sheets

(56) References Cited

U.S. PATENT DOCUMENTS

| | | | | |
|---|---|---|---|---|
| 6,775,782 B1* | 8/2004 | Buros | G06Q 20/04 | 380/30 |
| 7,069,440 B2* | 6/2006 | Aull | G06F 21/33 | 707/999.201 |
| 7,401,218 B2* | 7/2008 | Park | H04L 63/08 | 713/153 |
| 7,461,250 B1* | 12/2008 | Duane | H04L 9/3263 | 713/157 |
| 8,245,285 B1* | 8/2012 | Ravishankar | G06F 21/77 | 726/9 |
| 8,418,257 B2* | 4/2013 | Hoogerwerf | G06F 3/04883 | 726/26 |
| 8,495,377 B2* | 7/2013 | Haddad | H04L 63/0823 | 380/278 |
| 8,689,303 B1* | 4/2014 | Abidogun | H04L 63/08 | 709/223 |
| 8,843,752 B1* | 9/2014 | Priyadarshi | G06F 21/44 | 713/168 |
| 9,015,812 B2* | 4/2015 | Plattner | G06F 21/6245 | 713/154 |
| 9,710,649 B2* | 7/2017 | Da Palma | G06F 21/57 | |
| 9,813,285 B1* | 11/2017 | McGovern | H04L 41/00 | |
| 2001/0021928 A1* | 9/2001 | Ludwig | G06Q 20/3674 | 705/67 |
| 2002/0069361 A1* | 6/2002 | Watanabe | H04L 9/3231 | 713/185 |
| 2002/0124105 A1* | 9/2002 | Block | H04L 49/351 | 709/238 |
| 2002/0138738 A1* | 9/2002 | Sames | H04L 63/14 | 713/185 |
| 2002/0172222 A1* | 11/2002 | Ullmann | H04L 41/0213 | 370/468 |
| 2002/0174331 A1* | 11/2002 | Nock | G06F 9/44505 | 713/100 |
| 2002/0178387 A1* | 11/2002 | Theron | G06F 1/32 | 713/300 |
| 2003/0115475 A1* | 6/2003 | Russo | G06K 9/00026 | 713/186 |
| 2003/0151493 A1* | 8/2003 | Straumann | G07C 9/00015 | 340/5.25 |
| 2003/0163685 A1* | 8/2003 | Paatero | H04L 9/3263 | 713/155 |
| 2003/0220097 A1* | 11/2003 | Aono | H04M 1/667 | 455/410 |
| 2003/0226017 A1* | 12/2003 | Palekar | H04L 63/0428 | 713/168 |
| 2004/0003241 A1* | 1/2004 | Sengodan | H04L 9/3236 | 713/168 |
| 2004/0019790 A1* | 1/2004 | Aono | G06Q 20/341 | 713/172 |
| 2004/0078573 A1* | 4/2004 | Matsuyama | H04L 63/061 | 713/175 |
| 2004/0107366 A1* | 6/2004 | Balfanz | H04L 12/1822 | 726/5 |
| 2004/0111375 A1* | 6/2004 | Johnson | G06Q 20/06 | 705/64 |
| 2004/0253943 A1* | 12/2004 | Suzuki | H04M 1/72522 | 455/411 |
| 2005/0033796 A1* | 2/2005 | Gilbert | H04L 41/0893 | 709/200 |
| 2005/0034166 A1* | 2/2005 | Kim | H04N 7/17318 | 725/119 |
| 2005/0081037 A1* | 4/2005 | Kumagai | H04L 9/3268 | 713/175 |
| 2005/0108571 A1* | 5/2005 | Lu | G06F 21/34 | 726/4 |
| 2005/0138401 A1* | 6/2005 | Terao | H04N 7/163 | 713/189 |
| 2005/0203892 A1* | 9/2005 | Wesley | H04L 67/2838 | |
| 2005/0240765 A1* | 10/2005 | Genty | H04L 9/3263 | 713/175 |
| 2006/0015746 A1* | 1/2006 | Kusudo | H04N 7/1675 | 713/187 |
| 2006/0025132 A1* | 2/2006 | Karaoguz | H04L 12/2803 | 455/433 |
| 2006/0125422 A1* | 6/2006 | Costa | H02J 3/14 | 315/294 |
| 2006/0156392 A1* | 7/2006 | Baugher | G06F 21/10 | 726/5 |
| 2006/0253314 A1* | 11/2006 | Reznichenko | G06Q 10/06 | 705/7.27 |
| 2006/0253703 A1* | 11/2006 | Eronen | H04L 63/061 | 713/156 |
| 2006/0269222 A1* | 11/2006 | Horii | H04N 5/76 | 386/279 |
| 2006/0280127 A1* | 12/2006 | Mizuno | H04L 12/281 | 370/254 |
| 2007/0022469 A1* | 1/2007 | Cooper | H04K 1/00 | 726/3 |
| 2007/0033643 A1* | 2/2007 | Rossi | H04L 63/08 | 726/10 |
| 2007/0094493 A1* | 4/2007 | Ali | G06F 21/34 | 713/156 |
| 2007/0133218 A1* | 6/2007 | Yang | B60Q 1/302 | 362/459 |
| 2007/0150723 A1* | 6/2007 | Estable | H04L 63/0823 | 713/155 |
| 2008/0022380 A1* | 1/2008 | Lu | G06F 8/65 | 726/9 |
| 2008/0065776 A1* | 3/2008 | Moloney | H04L 63/06 | 709/229 |
| 2008/0065895 A1* | 3/2008 | Liu | H04L 63/0861 | 713/176 |
| 2008/0091950 A1* | 4/2008 | Hofmann | H04L 9/3247 | 713/176 |
| 2008/0117922 A1* | 5/2008 | Cockrell | H04L 12/66 | 370/401 |
| 2008/0134309 A1* | 6/2008 | Qin | G06F 21/105 | 726/6 |
| 2008/0313712 A1* | 12/2008 | Ellison | H04L 63/101 | 726/4 |
| 2009/0028078 A1* | 1/2009 | Balabine | H04L 63/0492 | 370/310 |
| 2009/0089353 A1* | 4/2009 | Fukuta | G06F 15/16 | 709/201 |
| 2009/0126001 A1* | 5/2009 | Krantz | G06F 21/33 | 726/10 |
| 2009/0210696 A1* | 8/2009 | Moreau | H04L 63/0435 | 713/151 |
| 2009/0217385 A1* | 8/2009 | Teow | G06F 21/604 | 726/27 |
| 2010/0208694 A1* | 8/2010 | Kumai | H04W 68/12 | 370/331 |
| 2010/0223464 A1* | 9/2010 | Lee | H04L 9/3273 | 713/168 |
| 2010/0226628 A1* | 9/2010 | Yamaji | H04N 13/30 | 386/353 |
| 2010/0268831 A1* | 10/2010 | Scott | H04W 64/00 | 709/228 |
| 2011/0154018 A1* | 6/2011 | Edstrom | H04L 63/0823 | 713/151 |
| 2011/0231535 A1* | 9/2011 | Starnes | H04W 4/001 | 709/223 |
| 2011/0289133 A1* | 11/2011 | Shikano | H04L 67/12 | 709/202 |
| 2011/0296171 A1* | 12/2011 | Fu | H04L 9/0825 | 713/156 |
| 2011/0302663 A1* | 12/2011 | Prodan | G06Q 20/10 | 726/30 |
| 2012/0016989 A1* | 1/2012 | Fuller | H04L 12/00 | 709/225 |
| 2012/0087302 A1* | 4/2012 | Chaturvedi | H04L 67/104 | 370/328 |
| 2012/0101912 A1* | 4/2012 | Sen | H04L 67/12 | 705/26.3 |
| 2012/0210123 A1* | 8/2012 | Castelnuovo | H04L 63/0823 | 713/156 |

(56) References Cited

U.S. PATENT DOCUMENTS

| | | | |
|---|---|---|---|
| 2013/0030906 A1* | 1/2013 | Hwang | G06Q 30/02 705/14.41 |
| 2013/0086377 A1* | 4/2013 | Cilfone | H04L 9/085 713/156 |
| 2013/0097656 A1* | 4/2013 | Kennedy | G06F 21/57 726/1 |
| 2013/0117558 A1* | 5/2013 | Metke | G06F 21/33 713/156 |
| 2013/0145151 A1* | 6/2013 | Brown | H04L 9/3268 713/156 |
| 2013/0159520 A1* | 6/2013 | Engelhart | H04L 65/1016 709/225 |
| 2013/0254535 A1* | 9/2013 | Akehurst | H04L 29/06 713/158 |
| 2013/0268755 A1* | 10/2013 | Simmons | G06F 21/10 713/156 |
| 2013/0290735 A1* | 10/2013 | Rombouts | G06F 21/33 713/189 |
| 2014/0006951 A1* | 1/2014 | Hunter | H04H 60/31 715/719 |
| 2014/0019955 A1* | 1/2014 | Summerer | G06F 21/57 717/171 |
| 2014/0032691 A1* | 1/2014 | Barton | H04L 41/00 709/206 |
| 2014/0051358 A1* | 2/2014 | Dina | H04L 12/6418 455/41.2 |
| 2014/0090083 A1* | 3/2014 | Kobayashi | G06F 21/10 726/27 |
| 2014/0097966 A1* | 4/2014 | Alexander | H04W 84/18 340/870.02 |
| 2014/0164776 A1* | 6/2014 | Hook | H04L 9/14 713/171 |
| 2014/0165160 A1* | 6/2014 | Bae | H04L 63/104 726/4 |
| 2014/0167929 A1* | 6/2014 | Shim | G08C 17/02 340/12.5 |
| 2014/0179276 A1* | 6/2014 | Kang | H04W 4/008 455/411 |
| 2014/0181521 A1* | 6/2014 | Hemphill | H04L 9/0819 713/171 |
| 2014/0187152 A1* | 7/2014 | Johnson | H04B 5/0031 455/41.1 |
| 2014/0208390 A1* | 7/2014 | Brown | G06F 21/33 726/4 |
| 2014/0218517 A1* | 8/2014 | Kim | H04L 12/2818 348/143 |
| 2014/0237235 A1* | 8/2014 | Kuno | H04L 9/0866 713/165 |
| 2014/0244834 A1* | 8/2014 | Guedalia | H04L 67/16 709/224 |
| 2014/0258441 A1* | 9/2014 | L'Heureux | H04W 12/06 709/217 |
| 2014/0279562 A1* | 9/2014 | Ignatchenko | G06Q 20/3829 705/71 |
| 2014/0281480 A1* | 9/2014 | Petty | H04L 63/166 713/151 |
| 2014/0324973 A1* | 10/2014 | Goel | H04L 12/2803 709/204 |
| 2014/0359552 A1* | 12/2014 | Misra | H04L 67/12 717/100 |
| 2015/0070585 A1* | 3/2015 | Sharif-Ahmadi | G08C 17/02 348/564 |
| 2015/0074195 A1* | 3/2015 | Mani | H04L 67/104 709/204 |
| 2015/0089673 A1* | 3/2015 | Beckman | H04L 63/105 726/29 |
| 2015/0095995 A1* | 4/2015 | Bhalerao | H04L 63/0823 726/6 |
| 2015/0222601 A1* | 8/2015 | Metz | H04L 63/04 726/9 |
| 2015/0237025 A1* | 8/2015 | Pal | H04L 63/06 713/165 |
| 2015/0271122 A1* | 9/2015 | Jalisatgi | H04L 51/18 713/158 |
| 2015/0271156 A1* | 9/2015 | Ronca | H04L 63/0876 713/168 |
| 2015/0288528 A1* | 10/2015 | Cho | G06F 8/61 713/158 |
| 2015/0341438 A1* | 11/2015 | Sloan | H04W 4/008 455/41.2 |
| 2015/0365238 A1* | 12/2015 | Hui | H04L 9/3247 713/178 |
| 2015/0378641 A1* | 12/2015 | Franke | G06F 3/0664 710/74 |
| 2016/0007288 A1* | 1/2016 | Samardzija | H04W 52/0229 370/311 |
| 2016/0013948 A1* | 1/2016 | Moses | H04L 41/28 713/156 |
| 2016/0029384 A1* | 1/2016 | Sidhu | H04W 72/0453 370/329 |
| 2016/0100028 A1* | 4/2016 | Erdmann | G08C 17/00 709/219 |
| 2016/0366139 A1* | 12/2016 | Ignatchenko | G06F 21/53 |

OTHER PUBLICATIONS

Metke, "Security Technology for Smart Grid Networks", IEEE Transactions on Smart Grid, vol. 1, No. 1, Jun. 2010, pp. 99-107.*

Chakrabarti, "Secure Access to IOT Network: An Application-based Group Key Approach", <https://www.iab.org/wp-content/IAB-uploads/2011/03/Chakrabarti.pdf>, Mar. 2011, 4 pages.*

Smith, "A JINI Lookup Service for Resource-Constrained Devices", Jan. 15-16, 2002, 10 pages.*

Ferguson, "Participatory Networking: An API for Application Control of SDNs", SIGComm'13, Aug. 12-16, 2013, pp. 327-338.*

Ohba, "An Authentication Client Proxy Mechanism for Resource-Constrained Devices", IEEE, 2012, pp. 1-8.*

Housley, "Internet X.509 Public Key Infrastructure Certificate and Certificate Revocation List (CRL) Profile", RFC 3280, Apr. 2002, 158 pages (pp. No. 1-129).*

Fischer, "Secure Identifiers and initial credential bootstrapping for IoT@Work", IEEE, 2012 Sith International Conference on Innovative Mobile and Internet Services in Ubiquitous Computing, pp. 781-786.*

Munoz Naranjo, "Enabling User Access Control in Energy-Constrained Wireless Smart Environments", Journal of Universal Computer Science, vol. 19, No. 17 (2013), pp. 2490-2502.*

Lakshmiraghavan, "Pro ASP.NET Web API Security", 2013, 403 pages.*

Alam, "Virtualizing Sensor for the Enablement of Semantic-aware Internet of Things Ecosystem", International Journal of Design, Analysis and Tools for Circuits and Systems, vol. 2, No. 1, Aug. 2011, pp. 41-51.*

Charciane, "Medical intelligent system for assisted living—proof of Concept", 2012, 6 pages.*

Savola, "Strategies for Security Measurement Objective Decomposition", IEEE, 2012, 8 pages.*

Fischer, "Security Architecture Elements for IoT enabled Automation Networks", 2012, IEEE, 8 pages.*

Granjal, "End-to-end transport-layer security for Internet-integrated sensing applications with mutual and delegated ECC public-key authentication", Networking 2013, 9 pages.*

Kywe, "Attack and Defense Mechanisms of Malicious EPC Event Injection in EPC Discovery Service", Proceeding of the 2013 IEEE International Conference on RFID Technologies and Applications, Sep. 4-5, 2013, 6 pages.*

Zhou, "A New Model for Reliable and Secure Multicast", 2013 International Conference on Computational and Information Sciences, IEEE, 2013, pp. 1620-1623.*

Blake-Wilson, "Transport Layer Security (TLS) Extensions", RFC 3546, The Internet Society, Jun. 2003, 29 pages.*

"Class AttributeCertificate", Feb. 1, 2001, Stiftung SIC/IAIK Java Doc, 41 pages.*

(56) References Cited

OTHER PUBLICATIONS

Bellavista, Paolo, Antonio Corradi, Mario Fanelli, and Luca Foschini. "A survey of context data distribution for mobile ubiquitous systems." ACM Computing Surveys (CSUR) 44, No. 4 (2012): 24. (Year: 2012).*

Perera, Charith, Prem Prakash Jayaraman, Arkady Zaslaysky, Dimitrios Georgakopoulos, and Peter Christen. "Sensor discovery and configuration framework for the internet of things paradigm." In Internet of Things (WF-IoT), 2014 IEEE World Forum on, pp. 94-99. IEEE, 2014. (Year: 2014).*

Kothmayr, T. et al., "A DTLS based end-to-end security architecture for the Internet of Things with two-way authentication", http://ieeexplore.ieee.org/xpl/articleDetails.jsp?reload=true&arnumber=6424088, as accessed on Jul. 21, 2014, Local Computer Networks Workshops (LCN Workshops), 2012 IEEE 37th Conference, Clearwater, FL, (Oct. 22-25, 2012), pp. 956-963.

Butt, Talal A., et al., "Adaptive and Context-aware Service Discovery for the Internet of Things", http://www.academia.edu/4526641/Adaptive_and_context_aware_service_discovery_for_the_internet_of_things_at_Rusmart_2013_conference, as accessed on Jul. 21, 2014, The 6th Conference on Internet of Things and Smart Spaces ruSMART 2013, St. Petersburg, Russia, (Aug. 28-29, 2013).

Gerdes, S. "Actors in the ACE Architecture", https://datatracker.ietf.org/meeting/90/agenda/ace-drafts.pdf, as accessed on Jul. 21, 2014, ACE Working Group, Universitaet Bremen TZI, (Jul. 4, 2014).

"Authentication and Authorization for Constrained Environments", https://datatracker.ietf.org/doc/charter-ietf-ace/, as accessed on Jul. 21, 2014, (On or before Jun. 16, 2014).

* cited by examiner

SYSTEMS AND METHODS FOR SECURE COMMUNICATIONS BETWEEN DEVICES

BACKGROUND

The Internet was originally designed to facilitate communication between computers. Increasingly, the Internet is being used to connect devices that are not typically considered to be computers or computing devices. One device currently available is a smart thermostat that can learn the schedule of people in the home and adjust the temperature to accommodate the schedule while reducing energy costs. The future may also bring a smart power grid that can communicate with smart thermostats, smart appliances, and home security systems, to optimize energy usage for an entire city, based on where people are and when tasks need to be completed.

One of the consequences of this vision of the future is a proliferation of connected devices. Every home, workplace, and vehicle could potentially include many connected systems, sensors, controls, and devices that may communicate and cooperate with each other with no human involvement. Even pets and farm animals may have sensors that monitor and report the animal's health and location. Estimates of the number of smart devices that may be connected to the Internet within the next decade vary widely, but range in the tens of billions. An initiative known as the Internet of Things (IoT), originating with the Institute of Electrical and Electronics Engineers (IEEE), promises to provide an impetus for growth in the number of connected devices, while helping to oversee development of standards for communication between devices.

A major concern associated with communication between devices is information security. For example, it may be appropriate for a smart thermostat to query a home security system to determine if anyone is home and which rooms of the house they may be occupying. That information, however, should not be available to people or devices outside the home without authorization by the homeowner. The smart thermostat should also not accept commands from devices in the house next door. Information security concerns become particularly acute with so-called constrained devices, which can respond to control directives from other devices, but lack the computing resources to identify the source or validity of the directives received. Accordingly, the instant disclosure identifies and addresses a need for additional and improved systems and methods for secure communication between devices.

SUMMARY

As will be described in greater detail below, the instant disclosure describes various systems and methods for secure communications between devices by identifying a control device using a security certificate that includes information that may be used for authenticating the device and determining privileges that may be granted to the control device over one or more smart devices. Systems and methods described herein may analyze requests by control devices to interact with smart devices to determine whether the smart device should respond to the requested interaction.

In one example, a computer-implemented method for secure communications between devices may include (1) receiving, from a control device that is capable of providing instructions to one or more smart devices, a security certificate that identifies the control device and also contains privilege information that indicates how the control device is allowed to interact with the smart devices, (2) receiving, from the control device, a request to interact with a smart device, (3) analyzing the privilege information in the security certificate to determine whether the requested interaction is allowed, and (4) controlling the requested interaction based on whether the privilege information indicates that the requested interaction is allowed.

In one embodiment, the computer-implemented method may further include identifying authentication information within the security certificate and attempting to use the authentication information to authenticate the control device. Controlling the requested interaction may be further based on whether the control device is successfully authenticated. In one embodiment, the authentication information may include a public encryption key. In one embodiment, the computer-implemented method may further include (1) receiving, from the smart device, a second security certificate that identifies the smart device, (2) identifying authentication information within the second security certificate, and (3) attempting to use the authentication information to authenticate the smart device. Controlling the requested interaction may be further based on whether the smart device is successfully authenticated. In one embodiment, an intermediary device receives the security certificate and the request to interact with the smart device, and the intermediary device determines on behalf of the second device whether the requested interaction is allowed.

In one embodiment, the privilege information indicates that the requested interaction is allowed. In this situation, controlling the requested interaction may include (1) performing a requested action, (2) transmitting a message reporting that the requested action has been performed, and/or (3) transmitting a message reporting a result of performing the requested action. In one embodiment, the privilege information indicates that the requested information is not allowed. In this situation, controlling the requested interaction may include ignoring the requested action and/or transmitting a message rejecting the request to perform the action.

In some examples, the computer-implemented method may further include creating a permission setting that contains permission information that indicates how the control device is permitted to interact with the smart device. In some examples, the privilege information may include the permission setting. Controlling the requested interaction may be based on determining whether the requested action is permitted by the permission setting. In some examples, creating the permission setting may further include requesting from a user an indication of how the control device is permitted to interact with the smart device, with the request sent in response to (1) receiving the security certificate for the control device, (2) receiving the request to interact with the smart device, and/or (3) receiving from the user an indication of how the control device is permitted to interact with the smart device.

In one embodiment, a system for implementing the above-described method may include several modules stored in memory, such as (1) a receiving module that receives, from a control device that is capable of providing instructions to one or more smart devices, a security certificate that identifies the control device and also contains privilege information that indicates how the control device is allowed to interact with the smart devices, and receives, from the control device, a request to interact with a smart device, (2) an analysis module that analyzes the privilege information in the security certificate to determine whether the requested interaction is allowed, and (3) a authorization module that controls the requested interaction based on whether the privilege information indicates that the requested interaction is allowed. The system may also include one or more physical processors configured to execute the receiving module, the analysis module, and the authorization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from a control device that is capable of providing instructions to one or more smart devices, a security certificate that identifies the control device and also contains privilege information that indicates how the control device is allowed to interact with the one or more smart devices, (2) receive, from the control device, a request to interact with a smart device, (3) analyze the privilege information in the security certificate to determine whether the requested interaction is allowed, and (4) control the requested interaction based on whether the privilege information indicates that the requested interaction is allowed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
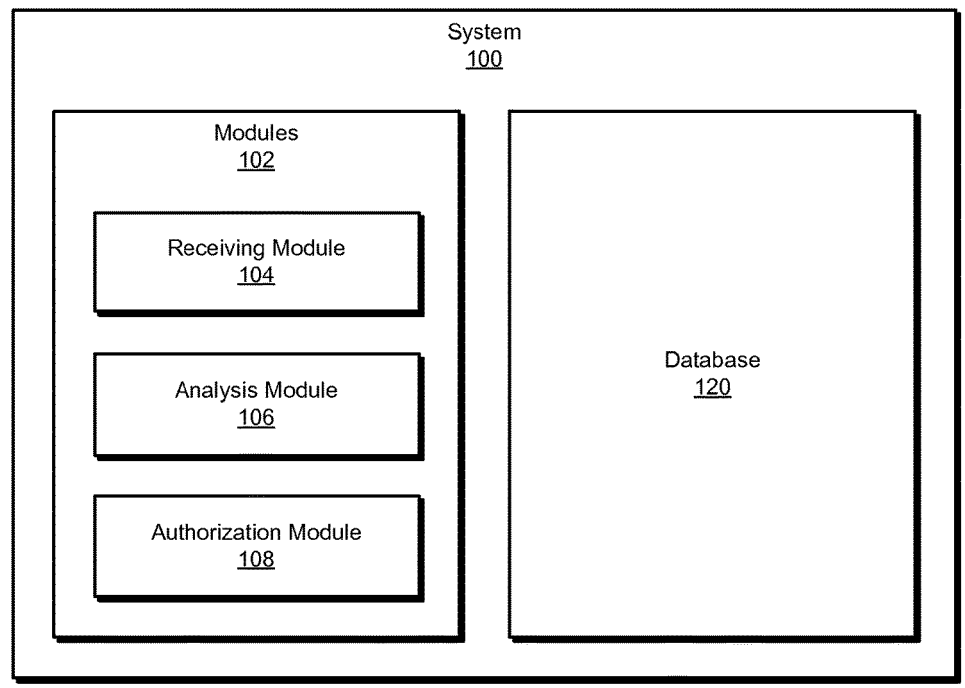
FIG. 1 is a block diagram of an exemplary system for secure communications between devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for secure communications between devices. As will be explained in greater detail below, systems and methods described herein may authenticate a control device and establish the privileges the control device has over one or more smart devices. Systems and methods described herein may also authenticate smart devices and establish mechanisms for secure communication between such devices. Additionally, systems and methods described herein may provide security and authentication services described for constrained devices (i.e., devices with limited memory, processing capability, etc.).

The following will provide, with reference to FIGS. 1, 2, 4, and 5, detailed descriptions of exemplary systems for secure communications between devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for secure communications between devices. As illustrated in this figure, exemplary system 100 may include one or more modules 102 for performing one or more tasks. For example, and as will be explained in greater detail below, exemplary system 100 may include a receiving module 104 that may receive, from a control device that may be capable of providing instructions to one or more smart devices, a security certificate that identifies the control device and also contains privilege information that indicates how the control device may be allowed to interact with the one or more smart devices. Exemplary system 100 may additionally include an analysis module 106 that may analyze the privilege information in the security certificate to determine whether the requested interaction may be allowed. Exemplary system 100 may also include an authorization module 108 that may control the requested interaction based on whether the privilege information indicates that the requested interaction may be allowed. Authorization module 108 may also control the requested interaction based on whether the privilege information indicates that the requested interaction may be allowed. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., smart device 202 and/or control device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information related to smart devices controlled by a control device, such as network locations of smart devices with which the control device is in communication, permissions the control device has been granted over the smart devices, etc. Database 120 may represent portions of a single database or computing device or a plurality of databases or computing devices. For example, database 120 may represent a portion of control device 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as control device 206 in FIG. 2, computing system 610 in FIG. 6, and/or portions of exemplary network architecture 700 in FIG. 7.

Figure 2:
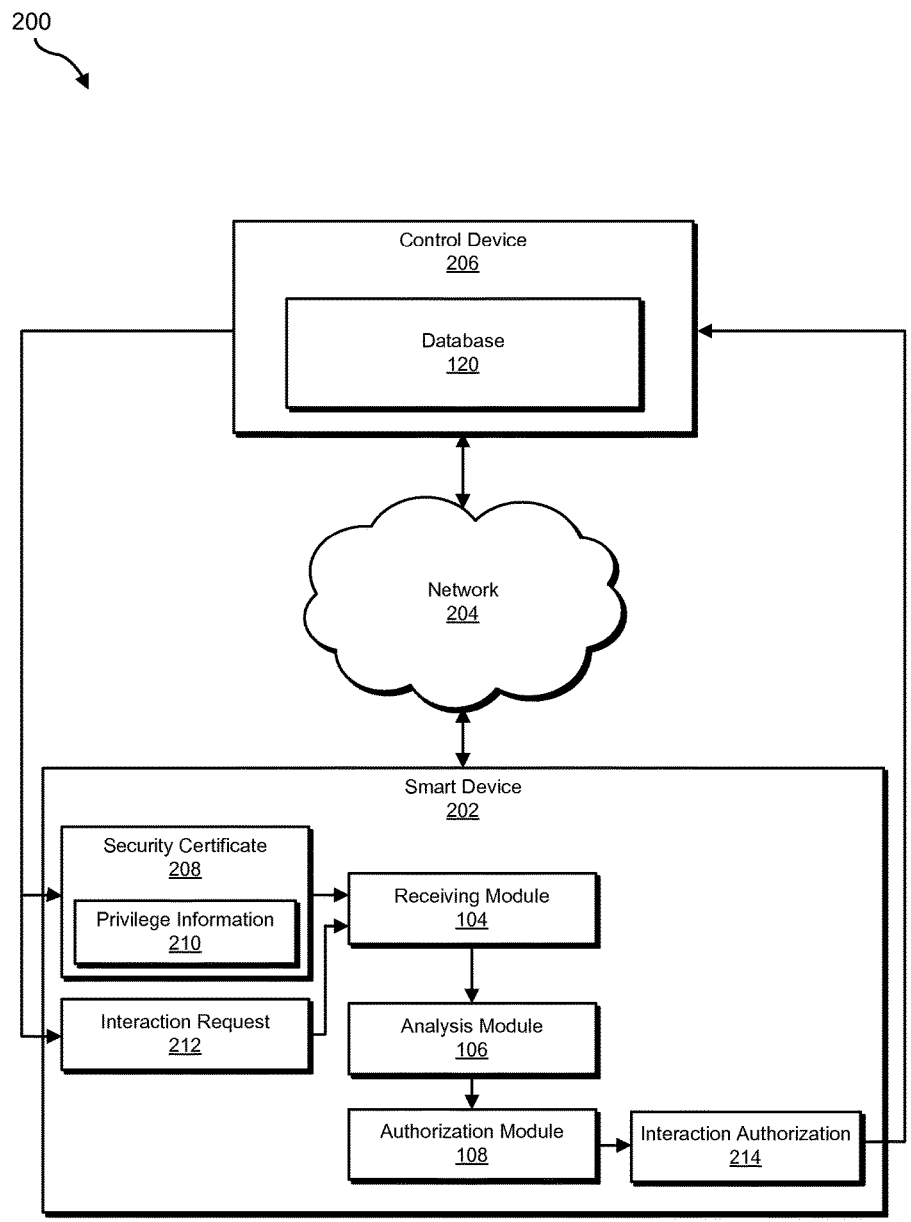
FIG. 2 is a block diagram of an additional exemplary system for secure communications between devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a smart device 202 in communication with a control device 206 via a network 204. In one example, smart device 202 may be programmed with one or more of modules 102 and/or may store all or a portion of the data in database 120. Additionally or alternatively, control device 206 may be programmed with one or more of modules 102 and/or may store all or a portion of the data in database 120.

In one embodiment, one or more of modules 102 from FIG. 1 may, when executed by at least one processor of smart device 202 and/or control device 206, enable smart device 202 and/or control device 206 to communicate securely. As will be described in greater detail below, one or more modules 102 from FIG. 1 may also be executed by an intermediary device. For example, and as will be described in greater detail below, receiving module 104 may receive, from control device 206 (which is capable of providing instructions to one or more smart devices 202), a security certificate 208 that identifies control device 206 and also contains privilege information 210 that indicates how control device 206 is allowed to interact with smart device 202. Receiving module 104 may receive, from control device 206, an interaction request 212 to interact with a smart device. Analysis module 106 may analyze privilege information 210 in security certificate 208 to determine whether the requested interaction is allowed. Authorization module 108 may control the interaction requested by interaction request 212, based on whether privilege information 210 indicates that the requested interaction is allowed.

Smart device 202 generally represents any type or form of computing device capable of reading computer-executable instructions. Examples of smart device 202 include, without limitation, sensors, monitors, smart controls, smart appliances, transponders, global positioning system (GPS) devices, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Control device 206 generally represents any type or form of computing device that is capable of storing, receiving, and transmitting data, and in particular capable of transmitting data in the form of control directives for smart devices. Examples of control device 206 include, without limitation, smart controls, embedded systems, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between smart device 202 and control device 206.

Figure 3:
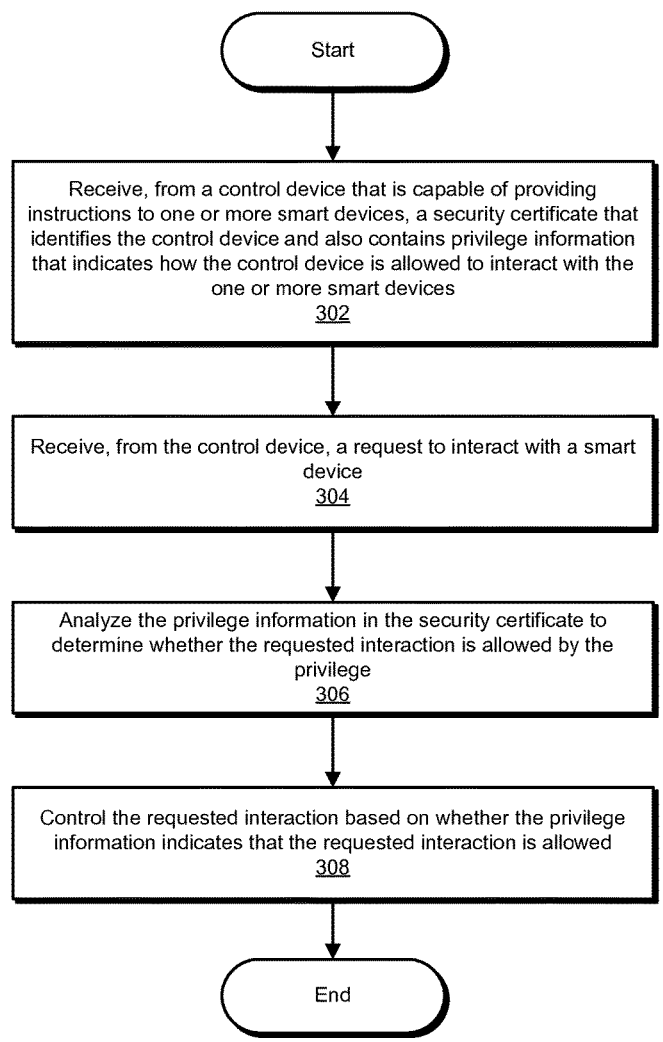
FIG. 3 is a flow diagram of an exemplary method for secure communications between devices.

FIG. 3 is a flow diagram of an exemplary computer-implemented method 300 for secure communications between devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may receive, from a control device that is capable of providing instructions to one or more smart devices, a security certificate that identifies the control device and also contains privilege information that indicates how the control device is allowed to interact with the one or more smart devices. For example, receiving module 104 may, as part of smart device 202 in FIG. 2, receive, from control device 206 (which is capable of providing instructions to one or more smart devices), security certificate 208 that identifies control device 206 and also contains privilege information 210 that indicates how control device 206 is allowed to interact with the one or more smart devices.

The term "security certificate," as used herein, generally refers to a digitally signed document that binds an identity with a public encryption key (e.g., to verify that the public encryption key belongs to a party identified by the security certificate). In some examples, a security certificate may be issued by a certificate authority. For example, a certificate authority may digitally sign a security certificate with a private key controlled by the certificate authority and publish a public key of a user to which the security certificate is issued. As an example, the security certificate may include an X.509 certificate. The term "privilege information," as used herein, generally refers to identifications, descriptions, or categories of interactions the control device may request of the smart device or devices with which the control device is requesting to interact.

Receiving module 104 may receive a security certificate and privilege information in a variety of ways and in various forms. For example, receiving module 104 may receive an X.509 certificate from a control device as part of an authentication process. In some examples, receiving module 104 may receive additional information identifying the control device, such as information identifying a user, network (internet protocol or media access control address, for example), organization, or certificate authority associated with the control device.

In one embodiment, systems described herein may include identifying authentication information within the security certificate and attempting to use the authentication information to authenticate the control device. As will be described later, in step 308 of FIG. 3, controlling the requested interaction may be further based on whether the control device is successfully authenticated. In one embodiment, the authentication information may include a public encryption key for the control device. The authentication information may also include a digital signature and identification of a public key algorithm that may be used to authenticate the digital signature for the control device, as well as identification of the certificate authority that issued the security certificate.

In one example, privilege information may be included as an extension in an X.509 certificate. In some examples, privilege information may specifically describe the types of interactions the control device may request from the smart device. For example, the control device may include within privilege information in the security certificate, a list of the commands the control device may send to the smart device. In another example, privilege information may indicate a general category or level of interactions that may be sent to the smart device. For example, the control device may send a privilege setting indicating whether the control device may send passive, active, or critical interactions to the smart device. Passive interactions may be information-only. Active interactions may be commands to be performed or configuration settings to be changed on the smart device. Critical interactions may be commands the smart device may not refuse and must perform.

At step 304, one or more of the systems described herein may receive, from the control device, a request to interact with a smart device. For example, receiving module 104 may, as part of smart device 202 in FIG. 2, receive, from control device 206, an interaction request 212 to interact with smart device 202.

Receiving module 104 may receive interaction requests from a control device in a variety of ways. For example, receiving module 104 may receive interaction requests as an extension in an X.509 security certificate, along with the privilege information received in step 302. This approach may be used to advantage when the interactions between the control device and smart device are expected to be infrequent or one-time-only. In another example, the smart device may provide a protocol for a control device to authenticate and submit interaction requests, to be used after the control device has initially authenticated itself by submitting a security certificate and privilege information.

In some examples, systems described herein may include creating a permission setting that contains permission information that indicates how the control device is permitted to interact with the smart device, where the privilege information may include the permission setting, and controlling the requested interaction is based on determining whether the requested interaction is permitted by the permission setting. For example, receiving module 104 may create an entry in a configuration file, such as a secure sockets layer (SSL) configuration file that indicates a level of interactions to be permitted between the control device and the smart device. The SSL configuration file may, for example, maintain a list of devices the smart device will communicate with, along with a permission setting for each device. A user may control the level of permitted interactions, either by granting or revoking permissions when prompted or by editing the SSL configuration file directly. The control device may, for example, be restricted to submitting only passive or information-only interactions to the smart device. In another example, a configuration file entry may enumerate specific types of interactions the control device may submit to the smart device. For example, a permission setting may indicate that a control device may submit device configuration commands to a smart device, with other types of commands not permitted.

In some examples, creating the permission setting may further include (1) requesting from a user an indication of how the control device is permitted to interact with the smart device, where the request is sent in response to receiving the security certificate for the control device, and/or receiving the request to interact with the smart device, and (2) receiving from the user an indication of how the control device is permitted to interact with the smart device. For example, when receiving module 104 receives the security certificate and privilege information from the control device, receiving module 104 may display information about the control device and ask the user to approve the privileges requested by the control device. Receiving module 104 may also direct the approval request to another device.

At step 306, one or more of the systems described herein may analyze the privilege information in the security certificate to determine whether the requested interaction is allowed. For example, analysis module 106 may, as part of smart device 202 in FIG. 2, analyze privilege information 210 in security certificate 208 to determine whether the interaction requested by interaction request 212 is allowed.

As will be described in greater detail below, analysis module 106 may evaluate a variety of factors in determining whether a requested interaction may be allowed. For example, analysis module 106 may evaluate whether the control device submitting the interaction request is the same control device identified by a previously submitted security certificate. Analysis module 106 may also evaluate whether the requested interaction is permitted by the privilege information submitted with the security certificate. In some examples, analysis module 106 may query a user to determine whether a requested interaction should be allowed. As will be described in greater detail below, analysis module 106 may also evaluate whether the control device has authenticated the identity of the smart device.

Analysis module 106 may also evaluate privilege information based on a permission setting. For example, a user may deny a control device permission to perform a requested action, even though privilege information included with the security certificate indicated that the control device indicated that the device has the privilege to perform the requested action.

At step 308, one or more of the systems described herein may control the requested interaction based on whether the privilege information indicates that the requested interaction is allowed. For example, authorization module 108 may, as part of smart device 202 in FIG. 2, control the interaction requested in interaction request 212 based on whether privilege information 210 indicates that the requested interaction is allowed.

Authorization module 108 may control the requested interaction in a variety of ways. For example, in one embodiment, the privilege information indicates that the requested information is allowed and authorization module 108 controls the requested interaction by (1) performing the requested action, (2) transmitting a message reporting that the requested action has been performed, and/or (3) transmitting a message reporting a result of performing the requested action. In one embodiment, the privilege information indicates that the requested information is not allowed and authorization module 108 may control the requested interaction by ignoring the requested action and/or transmitting a message rejecting the request to perform the action.

In one embodiment, authorization module 108 may require two-way authentication of both the control device and smart device by (1) receiving, from the smart device, a second security certificate that identifies the smart device, (2) identifying authentication information within the second security certificate, and (3) attempting to use the authentication information to authenticate the smart device. Authorization module 108 may control the requested interaction based on whether the smart device is successfully authenticated. Two-way authentication may be desirable when the control device may be in communication with several smart devices. Two-way authentication may facilitate identification of the smart device to which the control device is sending interaction requests. Two-way authentication may also be desirable when the control device may transmit sensitive information to the smart device.

Figure 4:
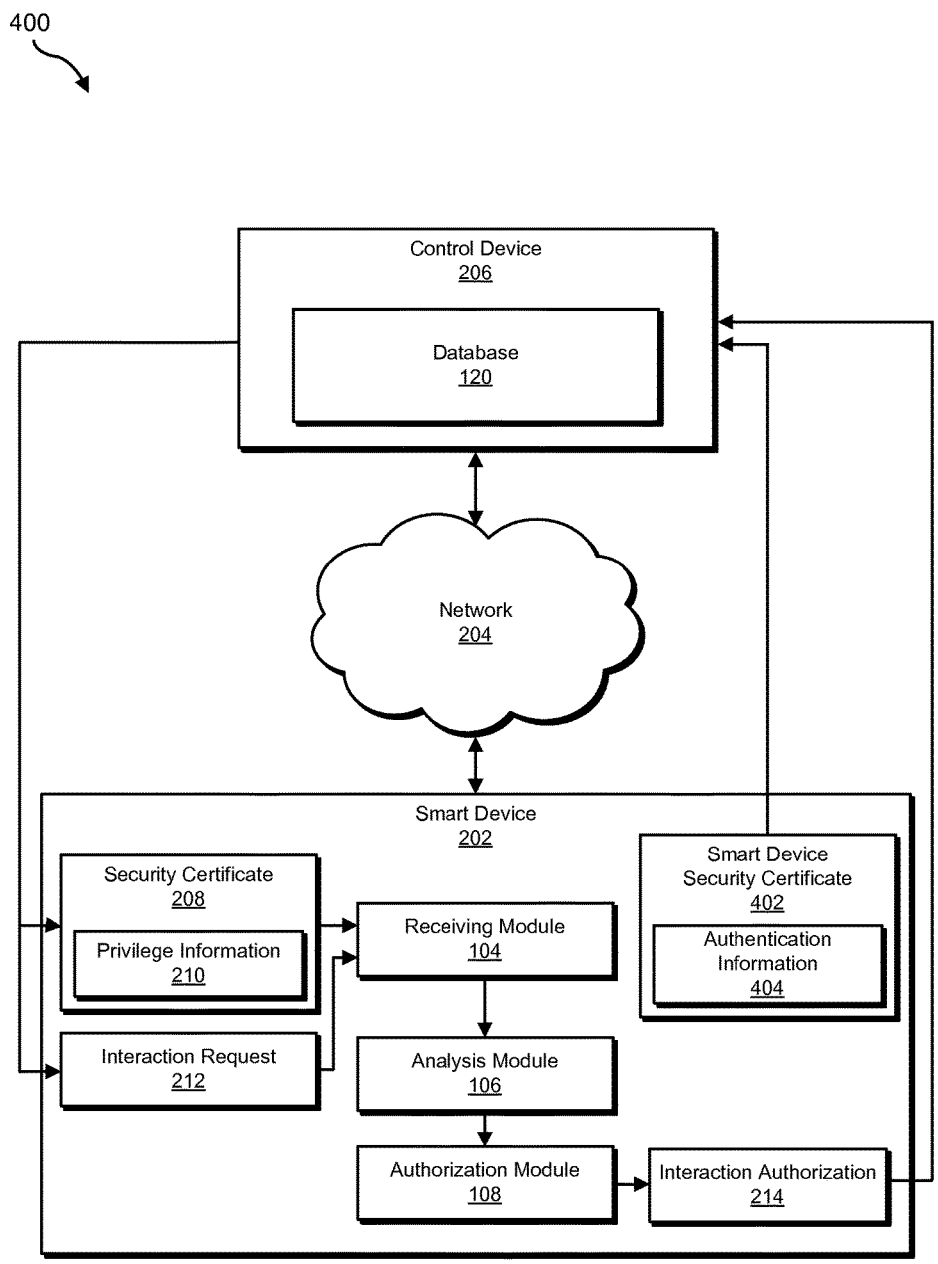
FIG. 4 is a block diagram of an exemplary system using two-way authentication.

FIG. 4 is a block diagram of an exemplary system 400 using two-way authentication. Exemplary system 400 includes components of exemplary system 200, shown in FIG. 2. In addition, exemplary system 400 includes smart device security certificate 402, which may include authentication information 404. As with security certificate 208, authentication information 404 included in security certificate 402 may include a public encryption key for the smart device. The authentication information may also include an X.509 digital certificate with a digital signature and identification of a public key algorithm that may be used to authenticate the digital signature for the smart device, as well as identification of the certificate authority that issued the security certificate.

In one embodiment, an intermediary device receives the security certificate and the request to interact with the smart device and the intermediary device determines on behalf of the second device whether the requested interaction is allowed. The intermediary device may manage the authentication process for both the control device and the smart device. The intermediary device may also authorize and initiate the requested interaction with the smart device. The use of an intermediary device may be advantageous when the smart device is actually a constrained device that may not possess computing resources to authenticate the control device and determine whether requested interactions should be permitted. Using an intermediary device may also permit centralization of the device authentication process to reduce administration overhead associated with managing several smart devices and/or constrained devices.

The term "constrained device," as used herein, generally refers to a device with limited processing speed, memory, bandwidth, and/or power resources. Any device may also be considered to be a constrained device if it is accessible only through a limited or unreliable network. Constrained devices may include remote sensors, mobile personal devices, building-automation devices, and some cellular phones.

Figure 5:
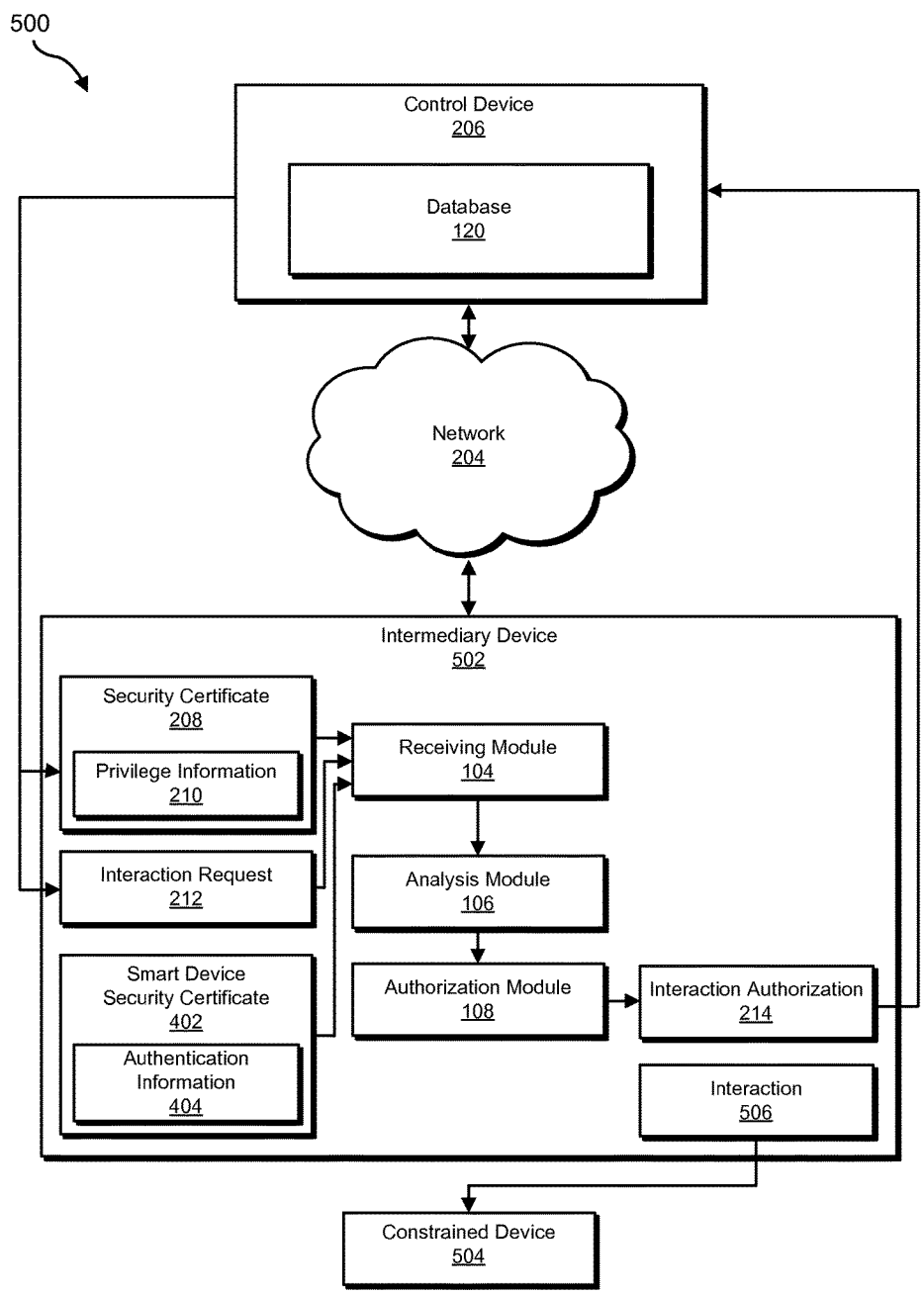
FIG. 5 is a block diagram of an exemplary system using an intermediary device to manage a constrained device.

FIG. 5 is a block diagram of an exemplary system 500 using an intermediary device to manage a constrained device. Exemplary system 500 includes components of exemplary system 200, shown in FIG. 2, and exemplary system 400, shown in FIG. 4. In addition, exemplary system 500 includes intermediary device 502 and constrained device 504. Intermediary device 502 may include modules 102 shown in FIG. 1. Receiving module 104 may receive security certificate 208 from control device 206 to authenticate control device 206. Receiving module 104 may also receive smart device security certificate 402 to authenticate constrained device 504. Smart device security certificate 402 may be installed on intermediary device 502 by a user or administrator, to enable intermediary device 502 to manage control device interactions with constrained device 504. If authorization module 108 determines that the interaction requested by interaction request 212 may be permitted, intermediary device 502 may initiate interaction 506 with constrained device 504.

As described above, the systems and methods described herein may secure communications between devices by authenticating a control device and establishing the privileges the control device has over one or more smart devices. Systems and methods described herein may also authenticate smart devices with which the control device interacts, to secure communications between the control device and smart devices. In some embodiments, systems and methods described herein may use an intermediary device to manage device authentication. The use of an intermediary device may simplify administration tasks. An intermediary device may also provide authentication and privilege evaluation services to constrained devices that lack resources to perform such services for themselves.

Systems and methods described herein may streamline the process of authenticating devices and establishing privilege relationships between control devices and smart devices by including privilege information in the security certificate. Privilege information may specify levels, classes, or specific types of interactions permitted to the control device. Systems and methods described herein may determine when to grant permission to a control device to interact with a smart device, and when to query an administrator or user to determine whether permissions should be granted. Systems and methods described herein may also make the process of submitting interaction requests more efficient, particularly in situations where the number of interactions between the control device and smart device are expected to be infrequent or one-time-only, by including interaction requests in the security certificate.

Figure 6:
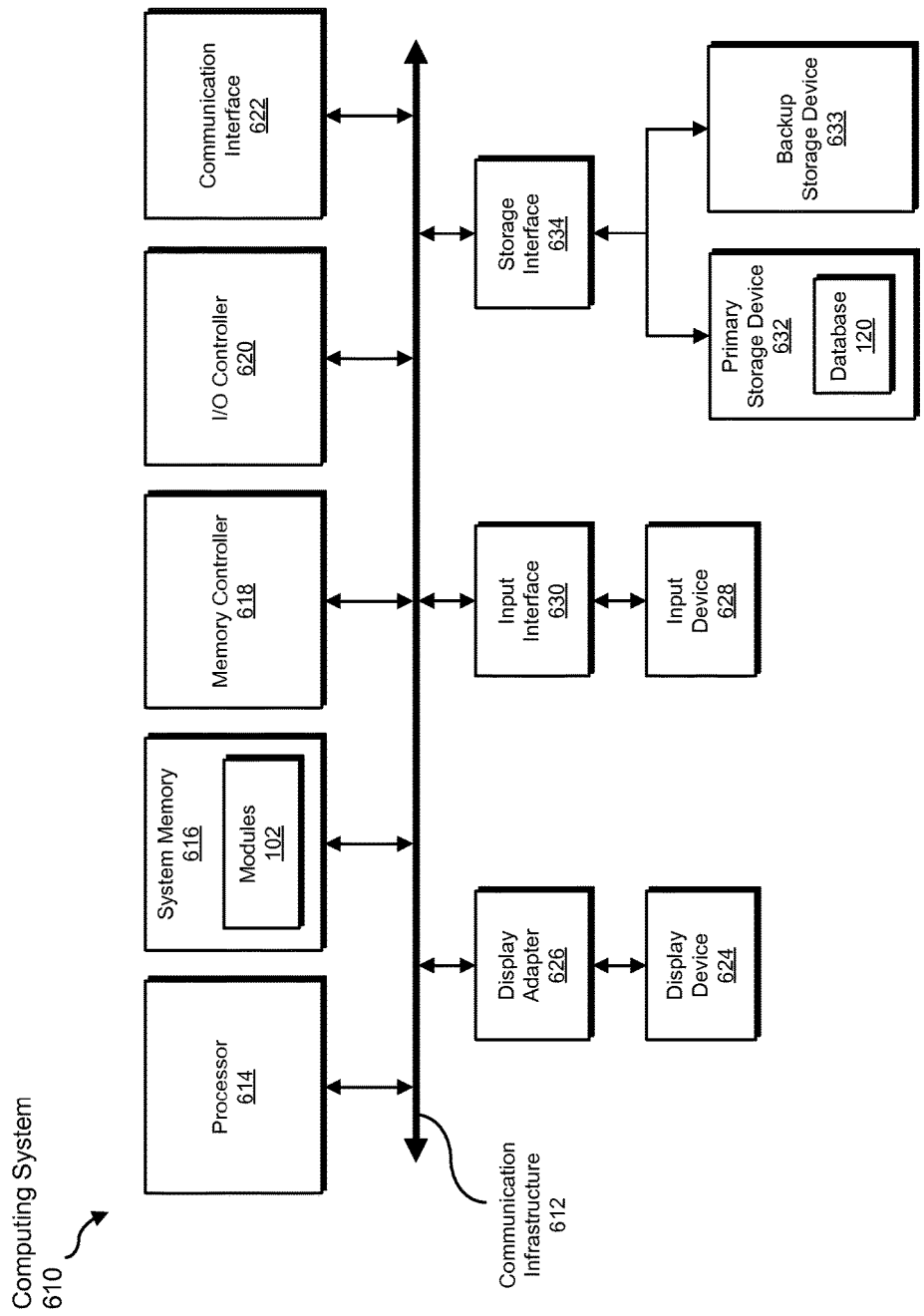
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
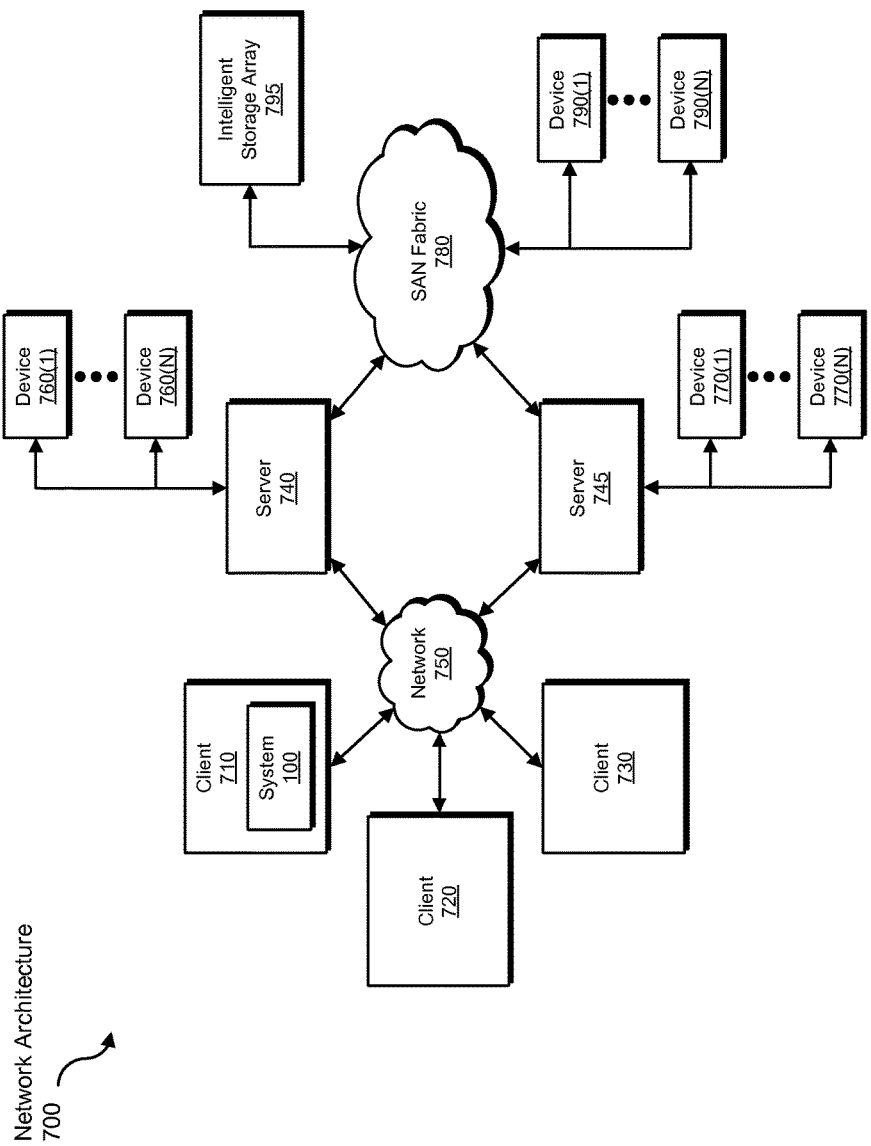
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for secure communications between devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, and output a result of the transformation to control a smart device. One or more of the modules described herein may also transform a computing system into a system for secure communication between devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for secure communications between devices, the steps of the method being performed by an intermediary computing device, comprising at least one processor, that provides authentication and privilege evaluation services to constrained devices, the method comprising:
   receiving, from a control device that is capable of transmitting control directives to a constrained smart device, a first X.509 certificate that binds an identity with a public encryption key and identifies the control device;
   retrieving, from the first X.509 certificate:
      authentication information comprising the public encryption key;
      a permission setting indicating that the control device is only permitted to submit a device configuration command to configure the constrained smart device specified by the first X.509 certificate, wherein other types of commands are not permitted; and
      an extension, within the first X.509 certificate, comprising a request from the control device to interact with the constrained smart device that lacks resources to perform authentication and privilege evaluation, wherein the requested interaction comprises a request to submit a command to the constrained smart device;
   determining, based on the request included in the extension, that the control device is requesting to submit a command to the constrained smart device;
   additionally receiving, from the constrained smart device, a second X.509 certificate;
   retrieving, from the second X.509 certificate, authentication information that identifies the constrained smart device;
   analyzing the authentication information in the first X.509 certificate in an attempt to use the authentication information to authenticate the control device;
   analyzing the authentication information in the second X.509 certificate in an attempt to use the authentication information to authenticate the constrained smart device;
   authenticating the control device based on the analyzed authentication information in the first X.509 certificate;
   authenticating the constrained smart device based on the analyzed authentication information in the second X.509 certificate; and
   upon successful authentication of the control device and the constrained smart device and in response to the determination that the requested interaction comprises a request to submit a command to the constrained smart device, restricting the requested interaction based on the permission setting in the first X.509 certificate, wherein restricting the requested interaction comprises:
      allowing the requested interaction in response to a determination that the requested interaction comprises a request to configure the constrained smart device; or
      rejecting the requested interaction in response to a determination that the requested interaction comprises a request to perform a type of command that is not a request to configure the constrained smart device.

2. The computer-implemented method of claim 1, further comprising creating the permission setting by:
   requesting from a user an indication of how the control device is permitted to interact with the constrained smart device; and
   receiving from the user an indication of how the control device is permitted to interact with the constrained smart device.

3. The computer-implemented method of claim 2, wherein the request for the indication is sent to the user in response to at least one of receiving the first X.509 certificate for the control device and receiving the request to interact with the constrained smart device.

4. The computer-implemented method of claim 1, wherein receiving the first X.509 certificate comprises receiving the first X.509 certificate as part of an authentication process.

5. The computer-implemented method of claim 1, wherein the authentication process comprises an authentication process managed by the intermediary device.

6. The computer-implemented method of claim 1, wherein rejecting the requested interaction comprises ignoring the requested interaction.

7. The computer-implemented method of claim 1, wherein rejecting the requested interaction comprises transmitting a message rejecting the requested interaction.

8. A system for secure communications between devices, the system comprising:
   a receiving module, stored in memory of an intermediary device that provides authentication and privilege evaluation services to constrained devices, that:
      receives, from a control device that is capable of transmitting control directives to a constrained smart device, a first X.509 certificate that binds an identity with a public encryption key and identifies the control device;
      retrieves, from the first X.509 certificate:
         authentication information comprising the public encryption key;
         a permission setting indicating that the control device is only permitted to submit a device configuration command to configure the constrained smart device specified by the first X.509 certificate, wherein other types of commands are not permitted; and
         an extension, within the first X.509 certificate, comprising a request from the control device to interact with the constrained smart device that lacks resources to perform authentication and privilege evaluation, wherein the requested interaction comprises a request to submit a command to the constrained smart device;
      determines, based on the request included in the extension, that the control device is requesting to submit a command to the constrained smart device;
      additionally receives, from the constrained smart device, a second X.509 certificate;
      retrieves, from the second X.509 certificate, authentication information that identifies the constrained smart device;
   an analysis module, stored in memory of the intermediary device, that:

analyzes the authentication information in the first X.509 certificate in an attempt to use the authentication information to authenticate the control device;
analyzes the authentication information in the second X.509 certificate in an attempt to use the authentication information to authenticate the constrained smart device;
an authorization module, stored in memory of the intermediary device, that:
authenticates the control device based on the analyzed authentication information in the first X.509 certificate;
authenticates the constrained smart device based on the analyzed authentication information in the second X.509 certificate;
upon successful authentication of the control device and the constrained smart device and in response to the determination that the requested interaction comprises a request to submit a command to the constrained smart device, restricts the requested interaction based on the permission setting in the first X.509 certificate, wherein restricting the requested interaction comprises:
allowing the requested interaction in response to a determination that the requested interaction comprises a request to configure the constrained smart device; or
rejecting the requested interaction in response to a determination that the requested interaction comprises a request to perform a type of command that is not a request to configure the constrained smart device; and
at least one physical processor configured to execute the receiving module, the analysis module, and the authorization module.

9. The system of claim 8, further comprising a permissions module, stored in memory of the intermediary device, that creates the permission setting by:
requesting from a user an indication of how the control device is permitted to interact with the constrained smart device; and
receiving from the user an indication of how the control device is permitted to interact with the constrained smart device.

10. The system of claim 9, wherein the permissions module sends the request to the user in response to at least one of receiving the first X.509 certificate for the control device and receiving the request to interact with the constrained smart device.

11. The system of claim 8, wherein the receiving module receives the request as part of an authentication process.

12. The system of claim 8, wherein the authentication process comprises an authentication process managed by the intermediary device.

13. The system of claim 8, wherein the authorization module rejects the requested interaction by ignoring the requested interaction.

14. The system of claim 8, wherein the authorization module rejects the requested interaction by transmitting a message rejecting the requested interaction.

15. A non-transitory computer-readable medium comprising one or more computer-readable instructions that, when executed by at least one processor of an intermediary computing device that provides authentication and privilege evaluation services to constrained devices, cause the intermediary computing device to:

receive, from a control device that is capable of transmitting control directives to a constrained smart device, a first X.509 certificate that binds an identity with a public encryption key and identifies the control device;
retrieve, from the first X.509 certificate:
authentication information comprising the public encryption key;
a permission setting indicating that the control device is only permitted to submit a device configuration command to configure the constrained smart device specified by the first X.509 certificate, wherein other types of commands are not permitted; and
an extension, within the first X.509 certificate, comprising a request from the control device to interact with the constrained smart device that lacks resources to perform authentication and privilege evaluation, wherein the requested interaction comprises a request to submit a command to the constrained smart device;
determine, based on the request included in the extension, that the control device is requesting to submit a command to the constrained smart device;
additionally receive, from the constrained smart device, a second X.509 certificate;
retrieve, from the second X.509 certificate, authentication information that identifies the constrained smart device;
analyze the authentication information in the first X.509 certificate in an attempt to use the authentication information to authenticate the control device;
analyze the authentication information in the second X.509 certificate in an attempt to use the authentication information to authenticate the constrained smart device;
authenticate the control device based on the analyzed authentication information in the first X.509 certificate;
authenticate the constrained smart device based on the analyzed authentication information in the second X.509 certificate; and
upon successful authentication of the control device and the constrained smart device and in response to the determination that the requested interaction comprises a request to submit a command to the constrained smart device, restrict the requested interaction based on the permission setting in the first X.509 certificate, wherein restricting the requested interaction comprises:
allowing the requested interaction in response to a determination that the requested interaction comprises a request to configure the constrained smart device; or
rejecting the requested interaction in response to a determination that the requested interaction comprises a request to perform a type of command that is not a request to configure the constrained smart device.

16. The non-transitory computer-readable medium of claim 15, wherein the computer-readable instructions further cause the intermediary computing device to create the permission setting by:
requesting from a user an indication of how the control device is permitted to interact with the constrained smart device; and
receiving from the user an indication of how the control device is permitted to interact with the constrained smart device.

17. The non-transitory computer-readable medium of claim 16, wherein the request for the indication is sent to the user in response to at least one of receiving the first X.509 certificate for the control device and receiving the request to interact with the constrained smart device.

18. The non-transitory computer-readable medium of claim 15, wherein the intermediary computing device receives the first X.509 certificate as part of an authentication process.

19. The non-transitory computer-readable medium of claim 18, wherein the authentication process comprises an authentication process managed by the intermediary device.

20. The non-transitory computer-readable medium of claim 15, wherein the computer-readable instructions cause the intermediary computing device to reject the requested interaction by at least one of:
    ignoring the requested interaction; and
    transmitting a message rejecting the requested interaction.

\* \* \* \* \*